United States Patent [19]

Yokoyama et al.

[11] Patent Number: 4,885,115

[45] Date of Patent: Dec. 5, 1989

[54] LIQUID ELECTROLYTE FOR USE IN ELECTROLYTIC CAPACITOR

[75] Inventors: Yutaka Yokoyama; Fumihiko Shinozaki, both of Tokyo, Japan

[73] Assignee: Nippon Chemi-Con Corporation, Tokyo, Japan

[21] Appl. No.: 168,103

[22] Filed: Mar. 14, 1988

[30] Foreign Application Priority Data

Mar. 12, 1987 [JP] Japan .................................. 62-57498

[51] Int. Cl.$^4$ .............................................. H01G 9/00
[52] U.S. Cl. .................................... 252/62.2; 361/505
[58] Field of Search ................... 252/62.2; 361/433 E, 361/503, 505

[56] References Cited

U.S. PATENT DOCUMENTS 4,117,531  9/1978  Ross et al. .......................... 252/62.2
4,454,567  6/1984  Ross et al. .......................... 252/62.2

*Primary Examiner*—John F. Niebling
*Assistant Examiner*—Kathryn Gorgos
*Attorney, Agent, or Firm*—Sughrue, Mion, Zinn, Macpeak & Seas

[57] ABSTRACT

A liquid electrolyte for use in an electrolytic capacitor is disclosed, wherein a mixture of γ-butyrolactone and acetonitrile is used as a solvent system, said mixed solvent containing as a solute at least one member selected from among monocarboxylic and dicarboxylic acid salts of tetraalkylammonium.

2 Claims, 2 Drawing Sheets

LIQUID ELECTROLYTE FOR USE IN ELECTROLYTIC CAPACITOR

FIELD OF THE INVENTION

The present invention relates to a liquid electrolyte for use in an electrolytic capacitor.

BACKGROUND OF THE INVENTION

Electrolytic capacitors have an anode that is at least made of a valve metal such as aluminum, tantalum, titanium or niobium. An insulating oxide film that serves as a dielectric layer is formed on the surface of a valve metal by anodization or some other means. An electrolyte layer is formed on the outer surface of the oxide film and a cathode connection is provided on the outer surface of the electrolyte layer.

The liquid electrolyte which the electrolyte layer is impregnated is formed by dissolving organic acids, inorganic acids or salts thereof in a variety of solvents. The electrolyte is in contact with the insulating anodized film layer on the surface of the anode and acts as the true cathode. Therefore, the characteristics of a liquid electrolyte are important factors that cause direct effects on the characteristics of an electrolytic capacitor.

The performance of electronic devices and machines is constantly improving, and this necessitates improvements in the characteristics of electrolytic capacitors such as electrical characteristics and the range of application temperatures. In particular, the specific resistivity of a liquid electrolyte has great effects on the electrical characteristics of electrolytic capacitors such as loss and impedance characteristics.

In an attempt to reduce the specific resistivity of a liquid electrolytes that use polyhydric alcohols (e.g. ethylene glycol) as solvents, the addition of water has been proposed. However, at temperatures in the higher range above 100° C., the water in the electrolyte will evaporate to raise the pressure in the capacitor and can cause an accident such as the breakage of a sealing portion. The presence of water is also detrimental to the capacitor's characteristics in the lower temperature range, and liquid electrolytes containing water can only be used satisfactorily at temperatures no lower than $-25°$ C. Therefore, the addition of water has been practically unsuitable for applications over a broad range of temperatures.

A triethylamine salt of maleic acid dissolved in an acid amide such as N,N-dimethylformamide has been proposed as a liquid electrolyte of low specific resistivity. This electrolyte features a reduced specific resistivity that approaches 100 $\Omega$ . cm at 30° C., but the evolution of gases is too high to warrant its use in commercial applications. An electrolyte having an ammonium salt of formic acid dissolved in N-methylformamide features a specific resistance that is lowered to a value near to 70 or 80 $\Omega$ . cm, but an electrolytic capacitor employing this electrolyte is also impractical since gases will evolve as a result of prolonged use.

A liquid electrolyte that has a dicarboxylic or monocarboxylic acid salt of tetraalkylammonium dissolved in an aprotic solvent system containing $\gamma$-butyrolactone has recently been proposed. This electrolyte is essentially water-free and yet features a low specific resistivity, so it has drawn much attention as a liquid electrolyte that could satisfy requirements for both a broad application temperature range and good electrical characteristics.

Attempts have been made to dissolve carboxylic acid salts of tetraalkylammonium in a solvent system solely composed of $\gamma$-butyrolactone or acetonitrile. But this has proved ineffective either because of a limited range of application temperatures (if a solvent capable of attaining a low specific resistivity is selected as the sole solvent) or on account of increased specific resistivity (if a solvent that permits a broad application temperature range is selected).

SUMMARY OF THE INVENTION

The present invention has been accomplished in order to solve the aforementioned problems of the prior art liquid electrolytes for use in electrolytic capacitors.

An object, therefore, of the present invention is to provide a liquid electrolyte suitable for use in an electrolytic capacitor that is to be incorporated in electric devices and machines that are required to exhibit superior electrical characteristics over a broad range of operating temperatures.

This object of the present invention can be attained by using a mixture of $\gamma$-butyrolactone and acetonitrile as the solvent of a liquid electrolyte, said mixed solvent containing as a solute at least one member selected from among mono-and dicarboxylic acid salts of tetraalkylammonium.

DETAILED DESCRIPTION OF THE INVENTION

Figure 1:
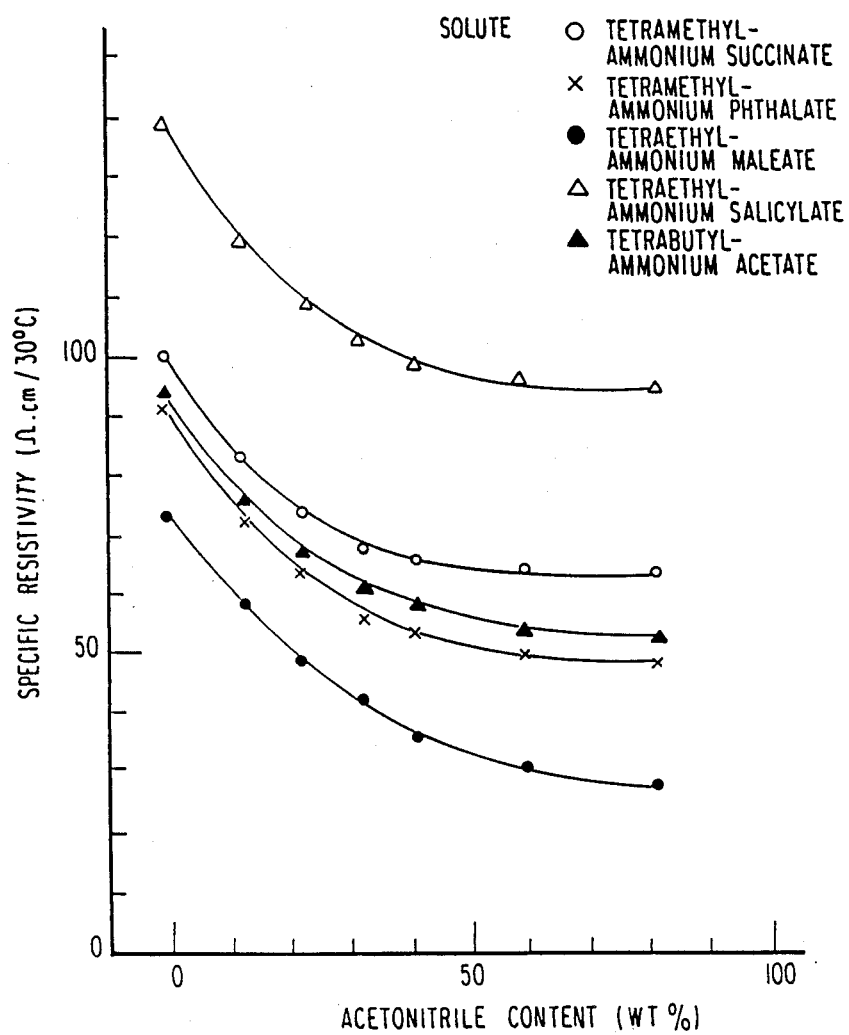
FIG. 1 is a graph showing the specific resistivity of a liquid electrolyte as a function of the acetonitrile to $\gamma$-butyrolactone ratio of the solvent system.

The liquid electrolyte of the present invention employs a mixture of $\gamma$-butyrolactone and acetonitrile as a solvent system, and this contributes to reduction in specific resistance and expansion of the range of application temperatures, notably toward the lower temperature range.

The objective of the present invention can be attained by using $\gamma$-butyrolactone in combination with acetonitrile. Better results are attained by mixing 10 to 90 wt % of acetonitrile with 90 to 10 wt % of $\gamma$-butyrolactone, and more preferably 20 to 50 wt % of acetonitrile and 80 to 50 wt % of $\gamma$-butyrolactone based on the solvent mixture.

The solute of the liquid electrolyte may be monocarboxylic or dicarboxylic acid salt of tetraalkylammonium. Illustrative solutes include but not limited to tetrabutylammonium formate, tetraethylammonium acetate, tetramethyl ammonium propionate, tetrabutylammonium butyrate, tetramethylammonium adipate, tetraethylammonium succinate, tetraethylammonium maleate, tetrabutylammonium itaconate, tetramethylammonium salicylate, and tetramethylammonium benzoate. These solutes may be used either independently or as admixtures. The solute is added preferably in an amount of 5 to 35 wt %, and more preferably 10 to 25 wt % based on the liquid electrolyte.

Into the liquid electrolyte of the present invention, various kinds of additives may be incorporated to improve the characteristics of the liquid electrolyte. For instance, phosphoric acid or phosphoric acid compounds prevent hydration of an oxidized film to stabilize characteristics of an electrolytic capacitor as is disclosed in Japanese Patent Publication 33/61, Nitro compounds such as nitrophenol, etc. prevent a generation of hydrogen gas to prevent a rise of the pressure in the capacitor as is disclosed in unexamined published Japanese Patent Application No. 93443/79. Further, resorcylic acid is used to lower an amount of a leaked electric current, and proton solvent and other carboxylic acids improve the solubility of an electrolyte capacitor to lower a specific resistivity.

The following example is provided for the purpose of further illustrating the present invention but is not taken to be limiting.

[Examples]

Each of the following solutes was incorporated in an amount of 15 wt % in a mixture solvent of γ-butyrolactone and acetonitrile having varying ratio thereof to produce a liquid electrolyte. The specific resistivities (Ω . cm at 30° C.) of the resulting electrolytes were measured.

Electrolytic capacitors were fabricated using the liquid electrolytes being tested and their characteristics were evaluated. Each of the capacitors had a voltage rating of 10 V and a capacitance of 220 μF. The procedure of capacitor fabrication was as follows: a strip of aluminum anode foil was rolled about itself together with a separator and a cathode foil to form a cylindrical capacitor element; the capacitor element was impregnated with a selected liquid electrolyte and put into a metal case which was sealed with a rubber compound.

FIG. 1 is a graph showing the specific resistivity of liquid electrolytes as a function of the acetonitrile to γ-butyrolactone ratio of the solvent system in which a variety of carboxylic acid salts of tetraalkylammonium are dissolved. The solutes used to construct the graph were: tetramethylammonium succinate (○), tetramethylammonium phthalate (X), tetraethylammonium maleate (●), tetraethylammonium salicylate (Δ), and tetrabutylammonium acetate The (▲). The parenthesized symbols are keyed to the symbols used in the graph. These solutes were dissolved in an amount of 15 wt % in solvent systems having varying acetonitrile to γ-butyrolactone ratios, and the specific resistivities (Ω . cm at 30° C.) of the resulting liquid electrolytes were measured.

As the graph in FIG. 1 shows, irrespective of the solute used, the electrolyte has a high specific resistivity when γ-butyrolactone is used as the sole solvent (the acetonitrile content is zero) although the absolute value of the specific resistivity varies with the type of solute used. As the content of acetonitrile increases, the specific resistivity of the electrolyte decreases, again by varying degrees. However, the decreasing specific resistivity substantially levels off after the acetonitrile content exceeds 50 wt %.

As the content of acetonitrile exceeds about 82 wt %, the solubility of each solute decreases at about −55° C., and it starts to precipitate or solidify thereby rendering the electrolyte unsuitable for use in practical applications. Therefore, the preferred upper limit of the acetonitrile content in the liquid electrolyte of the present invention should be less than 82 wt %.

Figure 2:
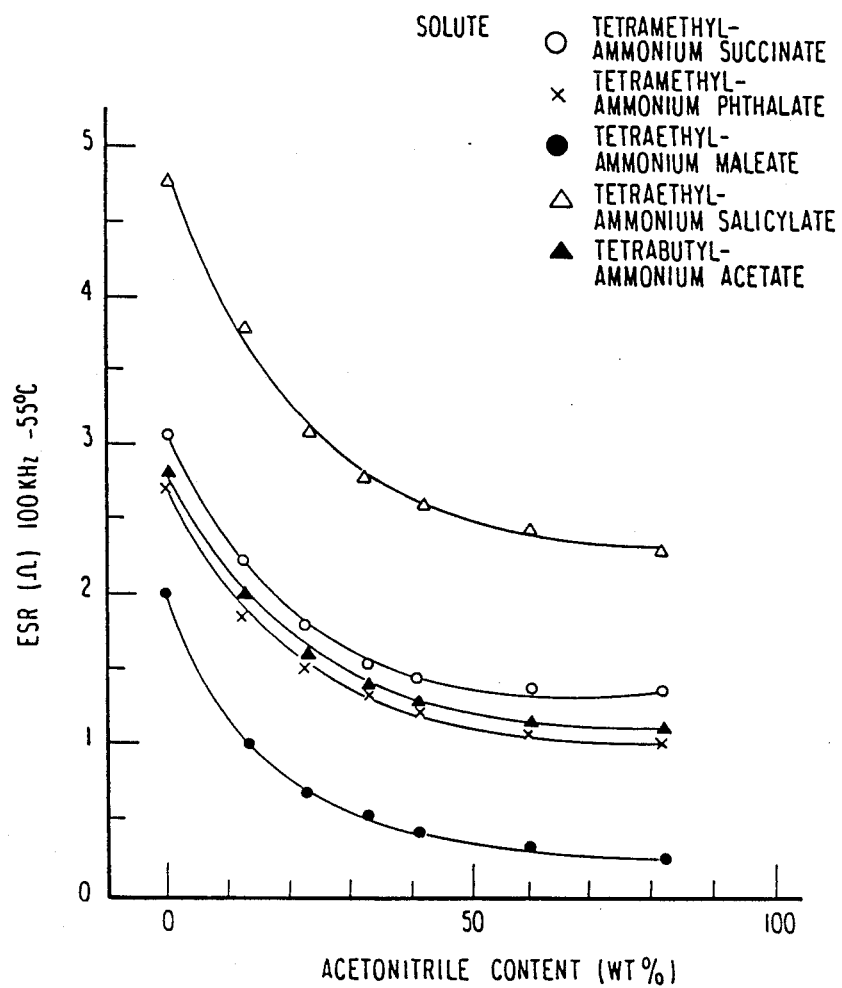
FIG. 2 is a graph showing the equivalent series resistance (ESR) of an electrolytic capacitor at $-55°$ C. as a function of the acetonitrile to $\gamma$-butyrolactone ratio of the solvent system in liquid electrolyte.

The characteristics of the electrolytic capacitors so fabricated are shown in FIG. 2 by a graph depicting the equivalent series resistance (ESR) of each capacitor at −55° C. as a function of the acetonitrile content of the solvent system. The solutes used to construct this graph were the same as those employed in constructing the graph shown in FIG. 1, with the same symbols being also used.

As is clear from the graph shown in FIG. 2, the ESR characteristics of the electrolytic capacitors at a low temperature had the same profile as the specific resistivities of the liquid electrolytes used. By using a mixture of γ-butyrolactone and acetonitrile as a solvent system for liquid electrolyte, low ESR values can be attained at a temperature of as low as −55° C.

In the present invention, a mixture of γ-butyrolactone and acetonitrile is used as the solvent system of a liquid electrolyte and this achieves the low level of specific resistivity that has not been attainable by an electrolyte using γ-butyrolactone as the sole solvent. The electrolyte of the present invention can satisfactorily be used even at −55° C. which has been considered infeasible with an electrolyte that uses acetonitrile as the sole solvent. Therefore, the present invention enables the fabrication of an electrolyte capacitor that features not only good electrical characteristics but also a broad range of application temperatures.

While the invention has been described in detail and with reference to specific embodiments thereof, it will be apparent to one skilled in the art that various changes and modifications can be made therein without departing from the spirit and scope thereof.

What is claimed is:

1. A liquid electrolyte for use in an electrolytic capacitor which uses a mixture of γ-butyrolactone and acetonitrile as a solvent system, said mixed solvent containing as a solute at least one member selected from among monocarboxylic and dicarboxylic acid salts of tetraalkylammonium.

2. A liquid electrolyte as in claim 1., wherein said solute is selected from the group consisting of tetrabutylammonium formate, tetraethylammonium acetate, tetramethylammonium propionate, tetrabutylammonium butyrate, tetramethylammonium adipate, tetraethylammonium succinate, tetraethylammonium maleate, tetrabutylammonium itaconate, tetramethylammonium salicylate, tetramethylammonium phthalate, and tetramethylammonium benzoate.

* * * * *